United States Patent
Rock

(10) Patent No.: US 8,032,247 B1
(45) Date of Patent: Oct. 4, 2011

(54) FABRIC SELECTION AND PERFORMANCE MATCHING

(75) Inventor: Moshe Rock, Brookline, MA (US)

(73) Assignee: MMI-IPCO, LLC, Lawrence, MA (US)

( * ) Notice: Subject to any disclaimer, the term of this patent is extended or adjusted under 35 U.S.C. 154(b) by 2186 days.

(21) Appl. No.: 10/824,004

(22) Filed: Apr. 14, 2004

Related U.S. Application Data

(60) Provisional application No. 60/466,360, filed on Apr. 29, 2003.

(51) Int. Cl.
*G06F 19/00* (2011.01)

(52) U.S. Cl. .................................................. 700/132

(58) Field of Classification Search ............... 700/130, 700/131, 132; 2/81, 82, 85, 87, 92
See application file for complete search history.

(56) References Cited

U.S. PATENT DOCUMENTS

| | | | | |
|---|---|---|---|---|
| 2,263,544 A * | 11/1941 | Rosenstein | | 2/90 |
| 2,976,539 A * | 3/1961 | Brown, Jr. | | 2/93 |
| 5,050,241 A * | 9/1991 | Flowers et al. | | 2/81 |
| 5,299,602 A * | 4/1994 | Barbeau et al. | | 2/81 |
| 5,323,815 A * | 6/1994 | Barbeau et al. | | 2/81 |
| 5,466,515 A * | 11/1995 | Blauer et al. | | 442/261 |
| 5,499,663 A * | 3/1996 | Barbeau et al. | | 2/81 |
| 5,640,718 A * | 6/1997 | Aldridge | | 2/81 |
| 5,727,401 A * | 3/1998 | Statham | | 2/458 |
| 5,920,905 A * | 7/1999 | Aldridge | | 2/81 |
| 5,933,865 A * | 8/1999 | Aldridge | | 2/81 |
| 6,038,700 A * | 3/2000 | Aldridge et al. | | 2/81 |
| 6,336,221 B1 * | 1/2002 | Blauer et al. | | 2/82 |
| 6,341,384 B1 * | 1/2002 | Hayes | | 2/81 |
| 6,397,401 B2 * | 6/2002 | Belcher | | 2/81 |
| 7,149,665 B2 * | 12/2006 | Feld et al. | | 700/131 |
| 2002/0025747 A1 * | 2/2002 | Rock et al. | | 442/59 |
| 2003/0033113 A1 * | 2/2003 | Chen et al. | | 702/155 |

OTHER PUBLICATIONS

Pause, Barbara; "Computer-optimized design of thermo-regulated activewear", Technical Textiles International, v10, n9, ISSN: 0964-5993, Nov. 2001.*

* cited by examiner

*Primary Examiner* — Nathan Durham
(74) *Attorney, Agent, or Firm* — Fish & Richardson P.C.

(57) ABSTRACT

Methods and apparatus, including computer program products, for fabric selection and performance matching. The method includes selecting a fabric combination from a set of different constructions and materials, the selection being made on a basis of predetermined characteristics of fabric performance and comfort required to meet specified parameters of conditions and manner of use.

19 Claims, 1 Drawing Sheet

FABRIC SELECTION AND PERFORMANCE MATCHING

CROSS-REFERENCE TO RELATED APPLICATIONS

This application claims priority based on U.S. Provisional Patent Application No. 60/466,360, for "Fabric Selection and Performance Matching," filed Apr. 29, 2003, the disclosure of which is incorporated here by reference in its entirety.

BACKGROUND

The present invention relates to fabric selection and performance matching.

In the manufacture of clothing, fabric selection for different end uses is often a trade off among competing factors and desires, depending on conditions and manner of final use.

SUMMARY

The present invention provides methods and apparatus, including computer program products, for fabric selection and performance matching.

In general, in one aspect, the invention features a method directed to a selection of a fabric from a set of fabrics of different constructions and materials, the selection being made on a basis of predetermined characteristics of fabric performance and comfort required to meet specified parameters of conditions and manner of use. The predetermined characteristics of performance and comfort are defined as a proximity range of an energy neutral zone, where a comfort level is in proximity to a desire range. The specified parameters of conditions and use include, for example, comfort, heat, cold, breathability and dryness.

In general, in another aspect, the invention features a method including measuring physical data on individual fabric layers and in combination with other combinations of fabric layers to determine characteristics of fabric performance and manner of use and storing the measured physical data in conjunction with fabrics.

The method can include displaying the measured physical data in conjunction with fabrics. Storing can include storing technical data sheets with the fabrics and/or retail outlet information with the fabrics.

The fabric combination comprises a first layer. The first layer comprises a knit construction. The knit construction is raised on a first side. The knit construction is raised on a second side. The knit construction is raised on a first side and on a second side. The fabric combination comprises an outer layer. The fabric combination comprises a first layer. The first layer is a knit. The fabric combination further comprises a second layer. The second layer is an insulation layer. The insulation layer is raised on a first side. The insulation layer is raised on a second side. The fabric combination further comprises a third layer. The third layer is weather protection layer. The third layer is raised on a first side. The third layer is raised on a second side. The third layer is a knit, woven or laminate coat construction. The outer layer is a knit, woven, or laminate coat construction.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
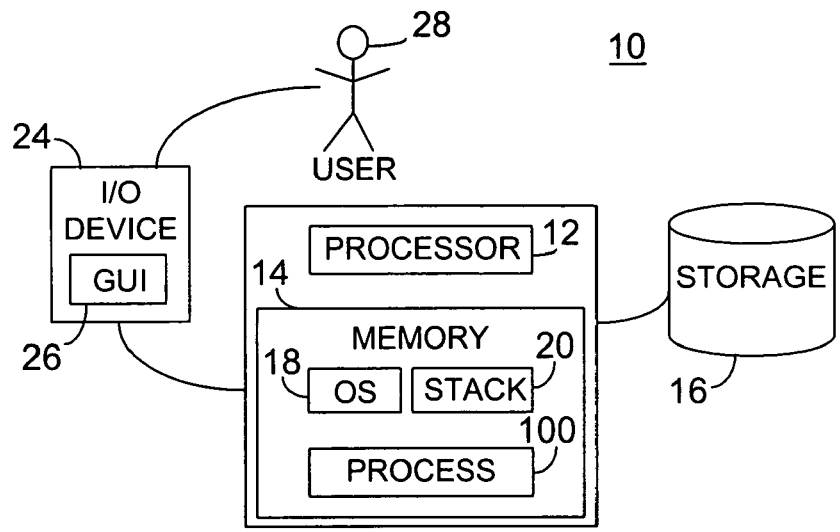
FIG. 1 is block diagram.

As shown in FIG. 1, a system 10 includes processor 12, memory 14 and storage device 16. Memory 14 includes an operating system (OS) 18, such as Linux, UNIX or Windows® XP, a TCP/IP stack 20 for communicating with a network (not shown), and a process 100 for determining a comfort zone for a garment. System 10 also includes a link to an input/output (I/O) device 24 for display of a graphical user interface (GUI) 26 to a user 28.

Figure 2:
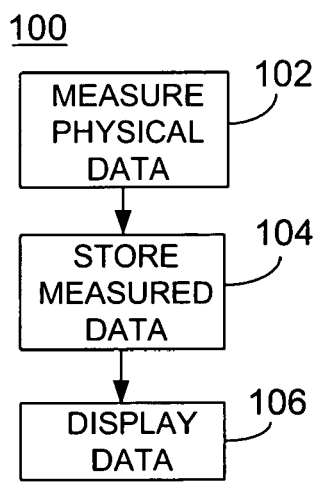
FIG. 2 is a flow diagram.

As shown in FIG. 2, the process 100 for determining a comfort zone for a garment includes measuring (102) physical data on individual fabric layers and in combination with other fabric layers. Process 100 stores (104) the measured physical data. Process 100 displays (106) the data to an end user (e.g., garment purchaser) who is then able to select an optimal layer in a layering for an intended physical activity in a projected ambient temperature.

In process 100, a physiological evaluation of thermal insulation balance depends on a balance of a metabolic energy production (M) and a heat loss via convection, conduction evaporation and a given ambient environment condition, like, for example, temperature, relative humidity and wind speed. The closer to an energy neutral zone, i.e., a minimum heat loss/gain, the more comfortable a human subject is. An energy balance is graded as a comfort index that is compiled to a comfort zone. Physical data is measured or extrapolated and placed into a numerical model, considering garment make up, fitting (e.g., tight fit or loose fit), posture, closures, air gap between layers, and so forth.

The above physical properties are measured, for example, in units of cal/sq. m/hr, on individual fabric layers and in combination with other layers. This data is gathered from laboratory testing in conjunction with a thermal mannequin in a dynamic environment. An end user (e.g., garment purchaser) is then able to select an optimal layer in a layering for an intended physical activity in a projected ambient temperature. Example physical activities are running, walking, hiking, ° standing and skiing. Example projected ambient conditions include range of temperature, wind speed, altitude and rain.

Figure 3:
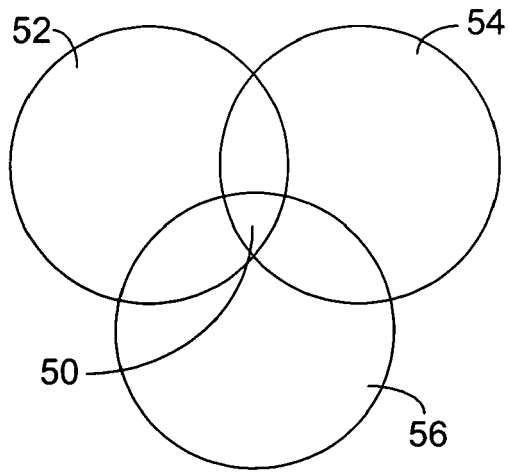
FIG. 3 is a block diagram.

As shown in FIG. 3, a comfort zone 50 includes an intersection of three fabrics (represented as circles) 52, 54, 56. For example, fabric 52 can be a first layer, such as underwear. Fabric 54 can be an insulation layer and fabric 56 a shell layer that gives protection from the environment. A silhouette design (e.g., tight fitting, loose fitting) as well as closure in the neck, calf, palm and air gap between layers, can also be taken into consideration. Process 100 enables a consumer to look deeper into each fabric 52, 54, 56 and to view specific information on a type of recommended layer, where it can purchased, and technical data. Thus, the consumer can select a garment system including individual layers that have technical enhancements when layered together and working in harmony.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims.

What is claimed is:

1. A computer-implemented method for determining a comfort zone comprising:
    selecting, in a data processing apparatus, a first knit fleece fabric from a set of knit fleece fabrics of different constructions and materials, the selection being made on a basis of (a) predetermined physical data of each knit fleece fabric individually and in combination with other knit fleece fabrics in the set of knit fleece fabrics, and (b) selection of one or more additional knit fleece fabrics in the set of knit fleece fabrics such that combined, the first knit fleece fabric and the one or more additional knit fleece fabrics in the set of knit fleece fabrics meet specified parameters of conditions and manner of use.

2. A computer-implemented method for determining a comfort zone comprising:
    selecting, in a data processing apparatus, a first knit fleece fabric from a set of knit fleece fabrics of different constructions and materials, the selection being made on a basis of (a) predetermined physical data of each knit fleece fabric individually and in combination with other knit fleece fabrics in the set of knit fleece fabrics, and (b) selection of one or more additional knit fleece fabrics in the set of knit fleece fabrics such that combined, the first knit fleece fabric and the one or more additional knit fleece fabrics in the set of knit fleece fabrics achieve a thermal neutral zone.

3. The computer-implemented method of claim 2 in which the first knit fleece fabric comprises a first layer.

4. The computer-implemented method of claim 3 in which the first layer comprises a knit construction.

5. The computer-implemented method of claim 2 in which the first knit fleece fabric comprises an outer layer.

6. The computer-implemented method of claim 5 in which the outer layer is a knit, woven, or laminate coat construction.

7. The computer-implemented method of claim 2 in which the first knit fleece fabric further comprises a second layer.

8. The computer-implemented method of claim 7 in which the second layer is an insulation layer.

9. The computer-implemented method of claim 7 in which the first knit fleece fabric further comprises a third layer.

10. The computer-implemented method of claim 9 in which the third layer is weather protection layer.

11. The computer-implemented method of claim 9 in which the third layer is a knit, woven or laminate coat construction.

12. A computer program product, tangibly embodied in an information carrier, for determining a comfort zone, the computer program product being operable to cause a data processing apparatus to:
    select a first knit fleece fabric from a set of knit fleece fabrics of different constructions and materials, the selection being made on a basis of (a) physical data of each knit fleece fabric individually and in combination with other knit fleece fabrics in the set of knit fleece fabrics, and (b) selection of one or more additional knit fleece fabrics in the set of knit fleece fabrics such that combined, the first knit fleece fabric and the one or more additional knit fleece fabrics in the set of knit fleece fabrics meet specified parameters of conditions and manner of use.

13. A computer-implemented method for determining a comfort zone, comprising:
    maintaining, by a data processing apparatus, information about a set of knit fleece fabrics of different constructions and materials, including physical data of each knit fleece fabric individually and in combination with other knit fleece fabrics in the set of knit fleece fabrics;
    receiving, by the data processing apparatus, specified parameters of conditions and manner of use; and
    selecting, by the data processing apparatus, a first knit fleece fabric from among the set of knit fleece fabrics, the selection being made on a basis of (a) the physical data, and (b) selection of one or more additional knit fleece fabrics in the set of knit fleece fabrics such that combined, the first knit fleece fabric and the one or more additional knit fleece fabrics in the knit fleece fabrics meet the specified parameters of conditions and manner of use.

14. The computer implemented method of claim 13, wherein the conditions and manner of use comprises ambient temperature and type of activity.

15. The computer-implemented method of claim 1, 2, or 13, further comprising:
selecting a second fabric and a third fabric, and wherein the first fabric is used as an underwear, the second fabric is an insulation layer, and the third fabric is a shell layer.

16. A computer-implemented method for determining a comfort zone, comprising:
providing, by a data processing apparatus, specified parameters of conditions and manner of use to a database that maintains information about a set of knit fleece fabrics of different constructions and materials, the maintained information including physical data of each knit fleece fabric individually and in combination with other knit fleece fabrics in the set of knit fleece fabrics; and
receiving, by the data processing apparatus, an indication of selection from the database of a first knit fleece fabric from among the set of knit fleece fabrics, the selection being made on a basis of (a) the physical data, and (b) selection of one or more additional knit fleece fabrics in the set of knit fleece fabrics such that combined, the first knit fleece fabric and the one or more additional knit fleece fabrics in the knit fleece fabrics meet the specified parameters of conditions and manner of use.

17. The computer implemented method of claim 16, wherein the conditions and manner of use comprises ambient temperature and type of activity.

18. A computer-implemented method for determining a fabric combination for a garment with a comfort zone, comprising:
maintaining, by a data processing apparatus, information about a set of fabrics of different constructions and materials, including physical data of each fabric individually and in combination with other fabrics in the set of fabrics;
receiving, by the data processing apparatus, parameters of ambient temperature and type of activity for a wearer of the garment; and
receiving, by the data processing apparatus, selection of the fabric combination from the set of fabrics for the garment from among the set of fabrics, the selection being made on a basis of (a) the physical data, and (b) selection of two or more fabrics from the set of fabrics for use as different layers such that the fabrics combination provides a thermal neutral zone given the parameters of ambient temperature and type of activity.

19. The counter implemented method of claim 18, wherein the fabric combination comprises a knit fleece fabric.

* * * * *